(No Model.)
J. BLUMER.
SAND FILTER AND TRAP.
No. 525,182. Patented Aug. 28, 1894.
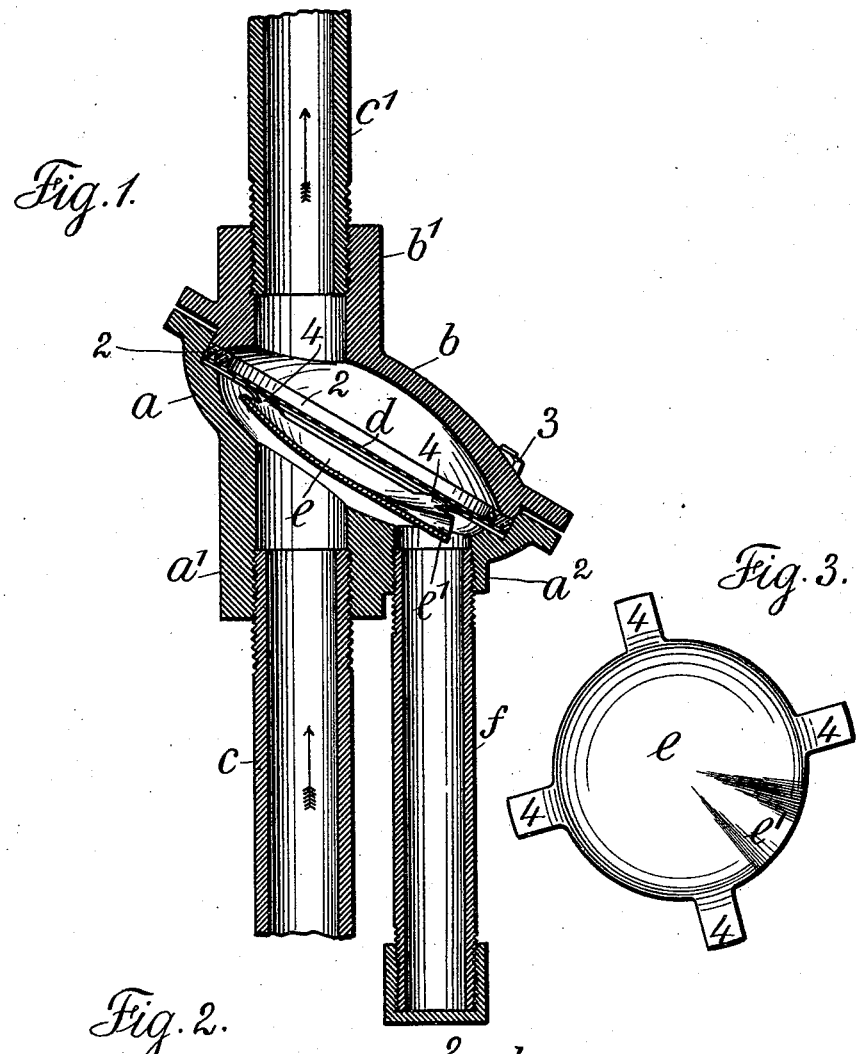
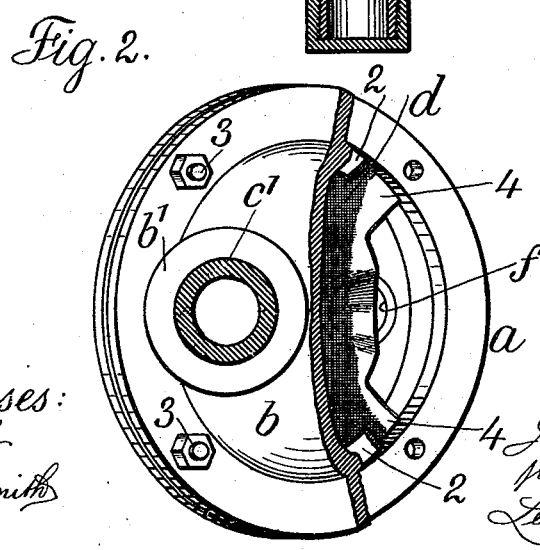
Witnesses:
J. Staib
Chas. H. Smith
Inventor:
James Blumer
per
Lemuel W. Serrell
Atty.

UNITED STATES PATENT OFFICE.

JAMES BLUMER, OF BROOKLYN, NEW YORK.

SAND FILTER AND TRAP.

SPECIFICATION forming part of Letters Patent No. 525,182, dated August 28, 1894.

Application filed October 30, 1893. Serial No. 489,446. (No model.)

*To all whom it may concern:*

Be it known that I, JAMES BLUMER, a citizen of the United States, residing at Brooklyn, in the county of Kings and State of New York, have invented a new and useful Improvement in Sand Filters and Traps, of which the following is a specification.

In driven and similar wells it frequently happens that sand is raised by the pump with the water, and this sand gets between the valves and their seats and prevents them fully closing and the pump holding the water, and besides, the sand acts to cut the valves of the pump so that they wear out rapidly, and the object of my invention is to overcome these objections.

In carrying out my invention I provide a sand filter and trap located in the pipe rising from the well to the pump. This sand filter and trap consists of two half shells within which is a screen secured at its periphery, and below the screen I place an inclined deflector plate of smaller diameter than the cavity and a pipe or similar receptacle closed at its lower end is connected to the lower half shell and receives the sand or other foreign matter from the deflector plate.

The water as it rises in the pipe is diverted and passes around the edges of the inclined deflector plate and through the screen and thence to the pump, and any sand or other foreign matter in the water is arrested by and below the screen and falls upon the inclined deflector plate from which it passes into the pipe or receptacle provided therefor. I prefer to make the entire filter at an inclination to facilitate the construction thereof and also the delivery of the sand and foreign matter into the pipe or receptacle.

In the drawings, Figure 1 is a vertical section showing my improvements. Fig. 2 is a plan of the same with parts broken away for greater clearness, and Fig. 3 is a plan of the dishing plate.

The two half shells $a$ $b$ are preferably connected by bolts 3 through their flanged edges, and the washer 2 between their inner meeting faces serves to form a water-tight joint. The shell $a$ is made with a hollow threaded boss $a'$ to screw upon the end of the pipe $c$ which passes to the well or water supply.

The shell $b$ is made with a hollow threaded boss $b'$ into which screws the lower end of the pipe $c'$ passing to the pump. A second hollow threaded boss $a^2$ on the under side of the shell $a$ receives the pipe or receptacle $f$, the lower end of which is closed by a cap or plug.

Within and extending across the cavity between the half shells, I place a screen $d$ which consists of a perforated metal plate of wire gauze secured at its periphery between the meeting edges of the half shells. Below the screen I place an inclined deflector plate $e$ that is concave and of smaller diameter than the cavity, and from said plate extend several radial fingers or supports 4 which pass beneath the edges of the screen $d$ and are held between the meeting edges of the half shells $a$ $b$. This inclined deflector plate is provided with a discharge lip $e'$ whose edge comes over the open upper end of the pipe or receptacle $f$.

By the action of a pump the water from the well rises in the pipe $c$ and is diverted by and flows around the edges of the inclined deflector plate $e$ and ascends through the screen $d$ and pipe $c'$ to the pump. Any sand or foreign matter in the water is arrested by the screen and settles upon the inclined plate $e$ and is delivered from the lip $e'$ thereof into the receptacle or pipe $f$, from which it can be periodically removed.

I have shown and prefer to make the half shells at an inclination to the vertical pipes $c$ $c'$, in which case the screen $d$ and plate $e$ are correspondingly inclined, and this facilitates the construction of the filter as well as the removal of sand and foreign material from the water and its delivery from the plate $e$ into the pipe or receptacle $f$.

I claim as my invention—

1. A sand filter and trap composed of a two-part hollow case or shells connected together, a screen across within the same, an inclined plate below the screen, and a receptacle for the foreign substances falling on the inclined plate, substantially as set forth.

2. The combination with the well pipes $c$ $c'$, of the half shells $a$ $b$ attached thereto and connected together, the screen $d$ across between the shells, the inclined deflector plate $e$ below the screen $d$, the screen and inclined plate being secured by the meeting edges of the shells, and the receptacle or pipe connected to and opening into the hollow case, substantially as set forth.

3. The combination with the well pipes $c\,c'$, of the half shells $a\,b$ inclined to the pipes $c\,c'$ and having bosses $a'\,b'$ to receive the pipes, the bolts 3 for connecting the half shells, and the packing ring 2 between their meeting edges, the screen $d$, the inclined deflector plate $e$ with extending fingers 4 and discharge lip $e'$, and the receptacle or pipe $f$ connected to the shell $a$ beneath the discharge lip, substantially as set forth.

Signed by me this 26th day of October, A. D. 1893.

JAMES BLUMER.

Witnesses:
GEO. T. PINCKNEY,
A. M. OLIVER.